(12) United States Patent
Yang

(10) Patent No.: US 9,206,914 B2
(45) Date of Patent: Dec. 8, 2015

(54) CHECK VALVE

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 190 days.

(21) Appl. No.: 14/040,542

(22) Filed: Sep. 27, 2013

(65) Prior Publication Data

US 2015/0090357 A1 Apr. 2, 2015

(51) Int. Cl.
*F16K 15/14* (2006.01)
(52) U.S. Cl.
CPC ......... *F16K 15/148* (2013.01); *Y10T 137/7879* (2015.04)
(58) Field of Classification Search
CPC ............. F16K 15/148; F16K 99/0015; Y10T 29/49412
USPC .................................................. 137/852, 854
See application file for complete search history.

(56) References Cited

U.S. PATENT DOCUMENTS 4,360,326 A * 11/1982 Buchholz et al. ............... 418/97

* cited by examiner

*Primary Examiner* — Kevin Lee
*Assistant Examiner* — P. Macade Nichols

(57) ABSTRACT

A check valve is provided. The check valve includes a position limiting member, a back-flow preventing member and a lid body. The back-flow preventing member is disposed between the position limiting member and the lid body, and a blocking portion of the back-flow preventing member is flexible. When the blocking portion is impacted by an external water source, a gap will be formed between an external peripheral verge of the blocking portion and a stepped portion of the position limiting member to allow the water source to flow through the position limiting member. When the blocking portion is impacted by a reverse water source, the external peripheral verge of the blocking portion is abutted against the stepped portion to unallow the water source to flow through the position limiting member.

5 Claims, 3 Drawing Sheets

CHECK VALVE

BACKGROUND OF THE INVENTION

1. Field of the Invention

The present invention relates to a check valve apparatus which can prevent fluids from flowing reversely.

2. Description of the Prior Art

The main object of check valve apparatuses is to allow fluids to flow toward the same direction and to block fluids from flowing reversely through the design of the valve. Please refer to TW 509300 for a conventional check valve apparatus. TW 509300 disclosed an integrally formed rubber body, wherein an end is a round water inlet, the other end is a water outlet with two side bodies gradually slanted forward, two side bodies of the furthest forward end of the water outlet are air tight, a front end of a ring body of the round inlet is formed with two semi-circle water-stopping rings, a step face in the upper part is formed with a ring trough, and two sides are formed with reinforcing bodies so as to prevent water from flowing reversely.

However, when the check valve apparatus blocks water from flowing reversely, the reverse water flow can produce a water pressure. When the water pressure of the reverse water flow is more than the two side bodies of the water outlet can endure, the two side bodies will be deformed. Hence, the water outlet will be open, and the reverse water flow will go through the water outlet and flow back to a water hose; that is, the check valve apparatus lost its function.

The present invention is, therefore, arisen to obviate or at least mitigate the above-mentioned disadvantages.

SUMMARY OF THE INVENTION

In view of the above-mentioned disadvantages, the main object of the present invention is to provide a check valve which has excellent effect of back-flow prevention and won't be affected by a water pressure of a reverse flow.

To achieve the main and other objects, the present invention provides a check valve, including a position limiting member, a back-flow preventing member and a lid body.

The position limiting member is formed with a first axle hole and a second axle hole wherein the first axle hole has a larger diameter than a diameter of the second axle hole, and a stepped portion is formed between the first and the second axle holes. The position limiting member includes a clasping portion. The back-flow preventing member includes a blocking portion and a fixing portion. The blocking portion is disposed in the first axle hole, and an external diameter of the blocking portion is larger than the second axle hole. The fixing portion is restrictedly assembled with the clasping portion. The lid body is disposed in the first axle hole and has at least one orifice and at least one abutting axle. The abutting axle is abutted against the back-flow preventing member so as to allow the back-flow preventing member to be fixed between the lid body and the position limiting member. The blocking portion is flexible; therefore, when the blocking portion is impacted by an external water source, a gap is formed between an external peripheral verge of the blocking portion and the stepped portion for allowing the first and the second diameter axle hole to be communicated with each other. When the blocking portion is impacted by a reverse water source, the external peripheral verge of the blocking portion is abutted against the stepped portion, so the first and the second diameter axle holes are non-communicated with each other.

Therefore, no matter how large water pressure the reverse water flow produces, the external peripheral verge of the blocking portion will neither fall off from the stepped portion nor create a gap. The check valve of the present invention can effectively prevent the water source from flowing back to a water hose.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
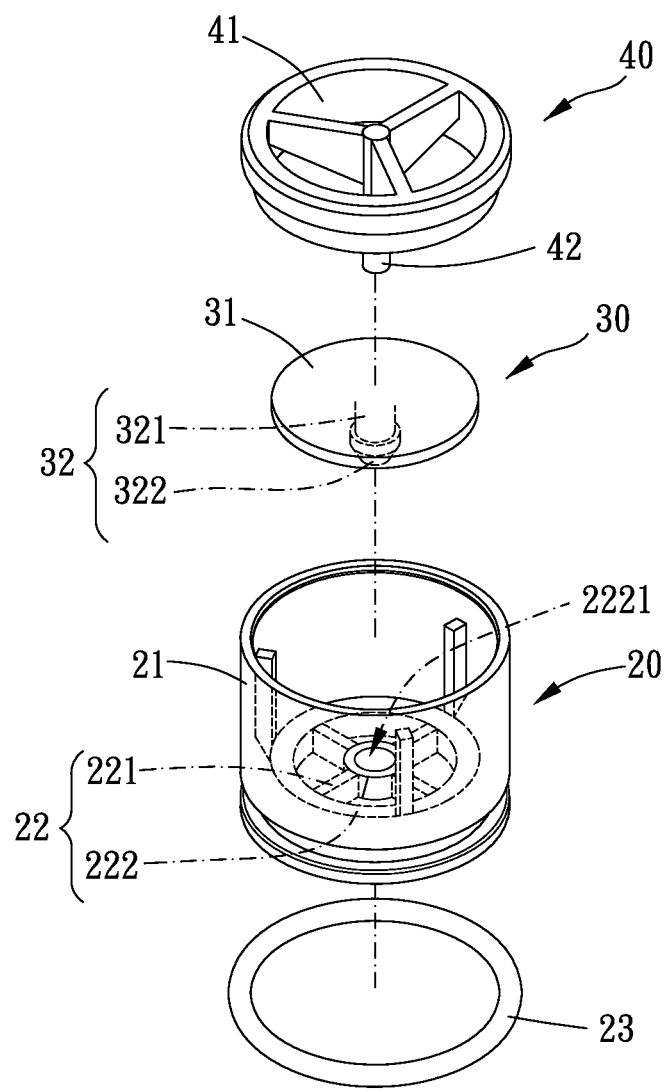
FIG. 1 is a perspective view of the present invention.
Figures 2, 2A:
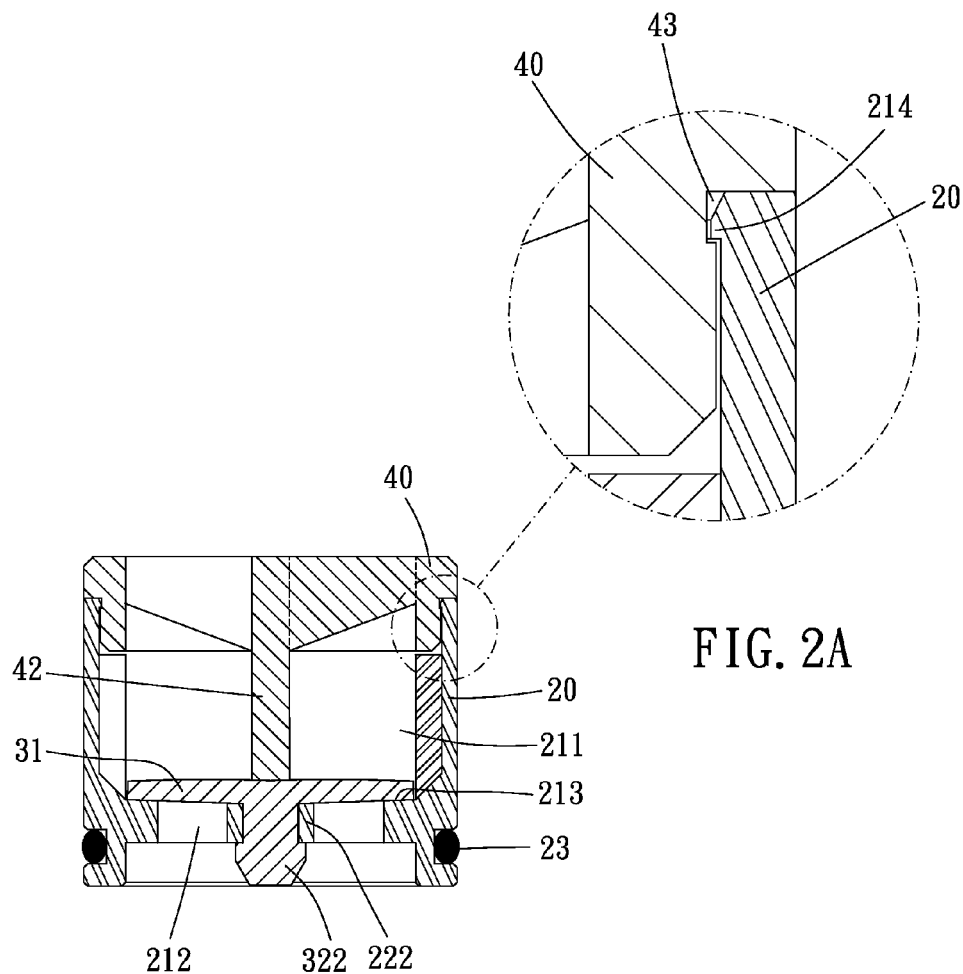
FIG. 2 is a cross-sectional view of the present invention.
FIG. 2A is a partially-enlarged view of FIG. 2.

Please refer to FIGS. 1, 2 and 2A for a check valve of the present invention, including a position limiting member 20, a back-flow preventing member 30 and a lid body 40.

The position limiting member 20 includes a hollow tubular body 21 and a clasping portion 22. The tubular body 21 is provided for being disposed in a water hose, and an external diameter of the tubular body 21 can be designed in accordance with the hoses a user wants to assemble. In this embodiment, an O ring 23 is disposed around an external surface of the tubular body 21 (the external surface of the tubular body 21 is formed with an annular groove for disposal of O ring 23), and the O ring 23 can increase the sealing effect of the tubular body 21 and the water hose. The tubular body 21 is formed with a first axle hole 211 and a second axle hole 212 wherein the first axle hole 211 has a larger diameter than a diameter of the second axle hole 212. A stepped portion 213 is formed between the first and the second diameter axle holes 211, 212, and an internal surface around the first axle hole 211 is formed with a hook portion 214. The clasping portion 22 includes a plurality of ribs 221 and a ring rib 222, and the ribs 221 are connected between the tubular body 21 and the ring rib 222. The ribs 221 are arranged in intervals and formed with a plurality of hollowed-out portions, and the ring rib 222 is formed with a through hole 2221. The positioning limiting portion 20 defines a central axis. The through hole 2221 is located at the central axis. An outer contour of the positioning limiting portion 20 defines an outer contour of the check valve.

The back-flow preventing member 30 includes a blocking portion 31 and a fixing portion 32. The blocking portion 31 is disposed in the first axle hole 211 of the tubular body 21, and the external diameter of the blocking portion 31 is larger than the second axle hole 212. Preferably, the blocking portion 31 is a flexible round sheet body, wherein the flexible round sheet body can be deformed when being affected by an external pressure and will return to its original state without the external pressure. The fixing portion 32 includes a neck portion 321 and a head portion 322, and the neck portion 321 is extended from the blocking portion 31 into the second axle hole 212; that is, an extending direction of the neck portion 321 is opposite to a flow direction of an external water source. On the contrary, the extending direction of the neck portion 321 is the same as a flow direction of a reverse water source. The head portion 322 is disposed at an end of the neck portion 321 remote from the blocking portion 31 and at a center of the blocking portion 31. Preferably, an end of the head portion 322 remote from the neck portion 321 is tapered, and preferably in a conical shape. The head portion 322 is disposed through the ring hole 2221 of the ring rib 222 and blocked by the ring rib 222, so the ring rib 222 is positioned between the head portion 322 and the blocking portion 31.

The lid body 40 is disposed in the first axle hole 211 and has a plurality of orifices 41 and at least one abutting axle 42. Each orifice is designed with an interval reinforcing sheet and has the effects of rectification and reinforcement. The abutting axle 42 is extended from a center of the lid body 40. The abutting axle 211 is located at the central axis and extends along the central axis. The abutting axle 42 is abutted against the back-flow preventing member 30 so as to allow the back-flow preventing member 30 to be positioned between the lid body 40 and the position limiting member 20. More specifically, the abutting axle 42 is abutted against a side of the blocking portion 31 of the back-flow preventing member 30 remote from the stepped portion 213 so as to allow the back-flow preventing member 30 to be fixedly positioned between the lid body 40 and the position limiting member 20. In this embodiment, the lid body 40 has a clasping slot 43. The hook portion 214 is barbed and stuckable in the clasping slot 43 so as to make the lid body 40 fixed in the first axle hole (The lid body 40 is deformable, which enables the hook portion to be stuckable in the clasping slot).

Figure 3:
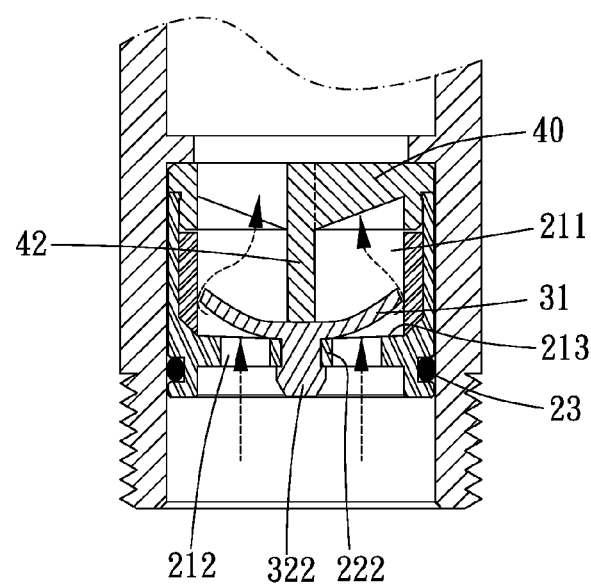
FIGS. 3 and 4 are drawings showing the present invention in use.

The check valve of the present invention can be assembled with the water hose as shown in FIG. 3. When water (fluid) flows into the second axle hole 212, it will cause a water pressure. Therefore, when the water source enters the second axle hole 212 of the tubular body 21, the water pressure will impact an external peripheral verge of the blocking portion 31 so as to make the external peripheral verge of the blocking portion 31 deformed and non-abutted against the stepped portion 213.

Figure 4:
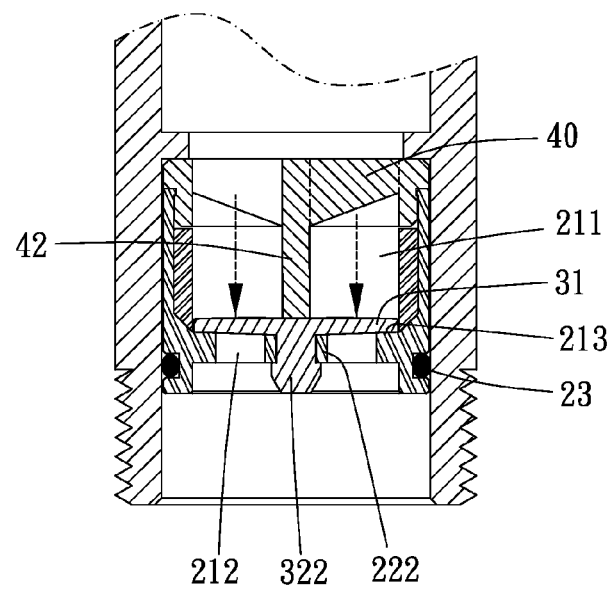

Therefore, a gap is formed between the external peripheral verge of the blocking portion 31 and the stepped portion 213, and the first and the second diameter axle holes 211, 212 are communicated with each other; that is, water (fluid) can enter the first axle hole 211 from the gap and circulate in the check valve of the present invention. On the contrary, when a user shuts off the water source, there won't be more water (fluid) entering the water hose, and some water (fluid) will flow reversely. As shown in FIG. 4, when the reverse water (fluid) flows into the first axle hole 211 of the tubular body, the water pressure of the reverse water (fluid) will be large enough to impact the external peripheral verge of the blocking portion 31, and the blocking portion 31 will return to its original state. Then, the external peripheral verge of the blocking portion 31 is abutted against the stepped portion 213, so the first and the second diameter axle holes 211, 212 are non-communicated with each other. Hence, the reverse water (fluid) is blocked by the blocking portion 31 and cannot enter the second axle hole 212 so as to prevent water (fluid) from flowing reversely effectively.

No matter how large water pressure the reverse water (fluid) causes, the external peripheral verge of the blocking portion 31 will neither fall off from the stepped portion 213 nor create a gap so as to make sure that water (fluid) will not flow reversely. What's more important, as the water pressure of the reverse water (fluid) increases, the external peripheral verge of the blocking portion 31 will be engaged tighter with the stepped portion 213. The engaging force and the reverse water pressure are in direct proportion, so the effect of back-flow prevention is more stable.

Furthermore, the fixing portion 32 of the back-flow preventing member 30 is restrictedly assembled with the clasping portion 22 of the position limiting member 20, and the abutting axle 42 of the lid body 40 is abutted against the back-flow preventing member 30, so the back-flow preventing member 30 is positioned by two affections (engaging force and the reverse water pressure) and fixedly disposed in the position limiting member 20. When the water source enters the second axle hole 212 of the tubular body 21, the fixing portion 32 of the back-flow preventing member 30 will not fall off from the clasping portion 22 of the position limiting portion 20 no matter how large the water pressure is.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A check valve, including:
   a position limiting portion, formed with a first axle hole and a second axle hole wherein the first axle hole has a larger diameter than a diameter of the second axle hole, a stepped portion formed between the large and small axle holes, the position limiting portion including a clasping portion, the positioning limiting portion defining a central axis, an outer contour of the positioning limiting portion defining an outer contour of the check valve;
   a back-flow preventing member, including a blocking portion and a fixing portion at a center thereof, the blocking portion disposed in the first axle hole, an external diameter of the blocking portion being larger than that of the second axle hole, the fixing portion restrictedly assembled with the clasping portion;
   a lid body, disposed in the first axle hole and having at least one orifice and at least one abutting axle, the abutting axle being located at the central axis and extending along the central axis, the abutting axle abutted against a side of the back-flow preventing member remote from the stepped portion so that the back-flow preventing member is positioned between the lid body and the position limiting portion;
   wherein, the blocking portion is flexible; when the blocking portion is impacted by an external water source, a gap is formed between an external peripheral verge of the blocking portion and the stepped portion and the first and the second diameter axle holes are communicated with each other;
   when the blocking portion is impacted by a reverse water source, the external peripheral verge of the blocking portion is abutted against the stepped portion and the first and the second axle holes are non-communicated with each other;
   wherein the position limiting portion includes a hollow tubular body, the clasping portion includes a pluarlity of ribs and a ring rib the ribs are connected between the tubular body and the ring rib, a plurality of hollowed-out portions are formed among the ribs, the ring rib is formed with a through hole, and a head portion of the fixing portion is disposed through the through hole and blocked by the ring rib, the through hole being located at the central axis.

2. The check valve of claim 1, wherein an internal surface around the first axle hole of the position limiting portion is formed with a hook portion, the lid body has a clasping slot, and the hook portion is stuckable within the clasping slot so as to fix the lid body in the first axle hole.

3. The check valve of claim 1, wherein an O-ring is disposed around an external surface of the position limiting portion.

4. The check valve of claim 1, wherein the blocking portion of the back-flow preventing member is a flexible round sheet body.

5. The check valve of claim 1, wherein the fixing portion of the back-flow preventing member includes the head portion and a neck portion, an end of the head portion remote from the neck portion is tapered to be conical, and the neck portion is positioned at the center of the blocking portion.

\* \* \* \* \*